United States Patent
McClellan et al.

(10) Patent No.: US 11,172,783 B2
(45) Date of Patent: Nov. 16, 2021

(54) TOOLS FOR SHAPING A FOOD ITEM

(71) Applicant: Taco Bell Corp., Irvine, CA (US)

(72) Inventors: Andrew McClellan, Walnut, CA (US);
Nancy Kanis, Dana Point, CA (US);
Edgar Guzman, Fontana, CA (US);
Jose Mercado, Azusa, CA (US); Javier Mercado, El Monte, CA (US); Greg Iorio, San Clemente, CA (US)

(73) Assignee: Taco Bell IP Holder, LLC, Irvine, CA (US)

( * ) Notice: Subject to any disclaimer, the term of this patent is extended or adjusted under 35 U.S.C. 154(b) by 464 days.

(21) Appl. No.: 16/114,777

(22) Filed: Aug. 28, 2018

(65) Prior Publication Data

US 2019/0069723 A1 Mar. 7, 2019

Related U.S. Application Data

(60) Provisional application No. 62/553,654, filed on Sep. 1, 2017.

(51) Int. Cl.
*A47J 37/12* (2006.01)
*A47J 36/20* (2006.01)
*A47J 37/10* (2006.01)
*A47J 43/20* (2006.01)
*A23P 30/10* (2016.01)
(Continued)

(52) U.S. Cl.
CPC .......... *A47J 37/1295* (2013.01); *A21D 13/42* (2017.01); *A23L 5/11* (2016.08); *A23P 30/10* (2016.08);
(Continued)

(58) Field of Classification Search
CPC ...... A47J 37/1295; A47J 36/20; A47J 37/108; A47J 37/1271; A47J 43/18; A47J 43/20;
(Continued)

(56) References Cited

U.S. PATENT DOCUMENTS 2,134,026 A 10/1938 Brooks
2,664,812 A * 1/1954 Molina ............... A47J 37/1295
249/120

(Continued)

FOREIGN PATENT DOCUMENTS

WO WO 2019/046280 3/2019
WO WO 2020/180851 9/2020

OTHER PUBLICATIONS

Invitation to Pay Additional Fees in co-pending International Application No. PCT/US2018/048311, dated Dec. 5, 2018 in 21 pages.
(Continued)

*Primary Examiner* — Ibrahime A Abraham
*Assistant Examiner* — Chris Q Liu
(74) *Attorney, Agent, or Firm* — Knobbe, Martens, Olson & Bear, LLP

(57) ABSTRACT

Systems and methods for shaping food items are provided. The systems and methods can shape the food items into taco shapes. A system can include a basket, a tool, and an insert. The basket includes troughs and a handle. The tool includes guides that receive patties made of, for example, potatoes, meat, and/or other food items. The insert includes wedges sized and shaped to fit through the guides and into the troughs of the basket. The tool is assembled with the basket in use, and frozen patties are placed in the guides. The insert is assembled with the tool such that the wedges contact the patties. The assembly is placed in hot oil to cook the patties. As the patties cook and soften, the insert moves downward relative to the tool and basket, and the wedges urge the patties into the troughs and into a taco shape.

5 Claims, 18 Drawing Sheets

(51) Int. Cl.
*A23L 5/10* (2016.01)
*A21D 13/42* (2017.01)
*A47J 43/18* (2006.01)

(52) U.S. Cl.
CPC .............. *A47J 36/20* (2013.01); *A47J 37/108* (2013.01); *A47J 37/1271* (2013.01); *A47J 43/18* (2013.01); *A47J 43/20* (2013.01); *A23V 2002/00* (2013.01)

(58) Field of Classification Search
CPC .. A47J 37/12; A23P 30/10; A23L 5/11; A21D 13/42; A23V 2002/00
USPC ......... 99/300, 393, 394, 353, 403, 409, 410, 99/416, 426, 427, 439
See application file for complete search history.

(56) References Cited

U.S. PATENT DOCUMENTS

| | | |
|---|---|---|
| 2,719,480 A | 10/1955 | Prickett et al. |
| 2,740,349 A | 4/1956 | De |
| 3,424,076 A * | 1/1969 | Brady ...................... A21B 5/08 99/416 |
| 4,517,887 A | 5/1985 | Childress |
| 9,504,356 B2 | 11/2016 | Matos |
| 2002/0017198 A1 | 2/2002 | Gauthier |
| 2012/0003363 A1 | 1/2012 | Beloff |
| 2014/0060340 A1* | 3/2014 | Matos ................. A47J 37/1295 99/416 |
| 2015/0258717 A1* | 9/2015 | Seto ........................ B29C 43/52 425/404 |
| 2019/0191931 A1 | 6/2019 | Hadis et al. |

OTHER PUBLICATIONS

International Search Report and Written Opinion in co-pending International Application No. PCT/US2018/048311, dated Jan. 31, 2019 in 24 pages.
International Search Report and Written Opinion in International Application No. PCT/US2020/020754, dated Jun. 19, 2020 in 15 pages.

* cited by examiner

TOOLS FOR SHAPING A FOOD ITEM

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

In particular, this application claims benefit of U.S. Provisional Patent Application Ser. No. 62/553,654 filed Sep. 1, 2017, which is hereby incorporated by reference in its entirety.

BACKGROUND

Field

The present disclosure relates generally to apparatuses and methods for shaping a food item, and more particularly, to tools and methods for shaping a patty into a taco shape.

Description of the Related Art

Various technologies and methods exist for shaping food items. For example, various devices and methods exist for forming tortillas into U-shaped hard shell tacos.

SUMMARY

The systems and methods described herein provide for the shaping of food items or products, for example, patties made of potatoes, meat, and/or other food item(s), into taco shapes. The systems and methods described herein can advantageously include features to help align various components of the systems.

In some embodiments, a system for changing a shape of a food item from a first shape to a second shape includes a tool and an insert. The tool includes a frame, two receptacles, and at least one post extending upwardly from the tool. Each receptacle is configured to receive a food item when the food item is in the first shape. The insert is configured to slidingly engage with the tool. The insert includes a frame, a guide, two wedges extending downward from the frame, and a handle. The guide of the insert is configured to receive and slide along an outer surface of the at least one post of the tool in use. Each wedge is configured to contact the food item received in one of the receptacles and urge the food item into the second shape.

In some such embodiments, the tool includes two posts and a crossbar extending between and connecting upper ends of the posts. The insert can include a locking mechanism. The locking mechanism includes a crossbar and a catch at each end of the crossbar. The crossbar and catches are pivotally coupled to the handle of the insert. As the insert is assembled with the tool in use, the crossbar and catches of the insert pivot relative to the handle to allow the crossbar and catches to slide past the crossbar of the tool. Once the crossbar and catches of the insert have cleared the crossbar of the tool, the crossbar and caches pivot back toward their original orientation and portions of the catches are disposed below the crossbar of the tool. If a user attempts to lift the insert away from the tool, the catches contact the crossbar of the tool and cause the tool to be lifted along with the insert.

In some embodiments, the insert includes two side guides. Each side guide extends outward and the downward from the frame of the insert. The side guides are configured to be received in gaps formed between the frame of the tool and the receptacles of the tool.

In some embodiments, the system further includes a basket including at least two troughs. The tool is configured to be placed on the basket such that the receptacles align with the troughs. The wedges are configured to urge each food item received in the two receptacles into the at least two troughs during cooking to shape each food item into the second shape.

In some embodiments, an insert for slidingly engaging with a basket and moving between a first position and a second position to change a shape of a food item from a first shape to a second shape during cooking in a fryer, wherein the basket includes at least one trough defining the second shape and a guide, includes a body having a channel and at least one wedge. The channel is sized and shaped to slidingly engage with the guide when the insert moves from the first position to the second position. The at least one wedge is sized and shaped to fit within the at least one trough and provide a gap between the at least one wedge and the at least one trough when the insert is in the second position. The gap has the second shape.

In some such embodiments, a system for changing the shape of a food item from a first shape to a second shape includes the insert and a tool. The tool is configured to be disposed on the basket and includes two receptacles. Each receptacle is configured to receive the food item when the food item is in the first shape. The insert is configured to slidingly engage the tool. In some embodiments, the tool includes at least one post and the insert includes a guide configured to slidingly engage the at least one post.

In some embodiments, a system for changing a shape of a food item from a first shape to a second shape during cooking in a fryer includes a basket, a tool, and an insert. The basket includes at least one trough defining the second shape and at least one peak. The basket is configured to be at least partially submerged in the fryer. The tool is configured to be disposed on the basket. The tool includes a receptacle that is configured to receive the food item when the food item is in the first shape. The insert includes a pair of channels and at least one wedge. The pair of channels are sized and shaped to slidingly engage with the at least one peak when the insert moves from a first position to a second position relative to the tool. The at least one wedge is sized and shaped to fit within the at least one trough and provide a gap between the at least one wedge and the at least one trough when the insert is in the second position such that the gap has the second shape.

In some such embodiments, the tool includes at least one upwardly extending post, and the insert includes a guide configured to slidingly receive the at least one post. In some embodiments, the tool includes a handle and the insert includes a handle. The handle of the insert is configured to engage the handle of the tool when the insert moves to the second position.

In some embodiments, a method for changing a shape of a food item from a first shape to a second shape during cooking in a fryer includes: providing a basket having at least one trough defining the second shape and at least one peak, the basket being configured to be at least partially submerged in the fryer; locating a tool having a receptacle to a position on the basket, the receptacle having the first shape; placing the food item in the receptacle; locating an insert having a pair of channels and at least one wedge above the tool so that the pair of channels are aligned with the at least one peak; lowering the insert onto the tool so that the pair of channels slidingly engage with the at least one peak until the at least one wedge rests on the food item; and lowering at least portions of the basket, the tool, and the insert into the fryer so that the pair of channels continue to slidingly engage with the at least one peak while the at least one wedge presses the food item into the at least one trough to form the second shape while cooking.

All of these embodiments are intended to be within the scope of the disclosure herein. These and other embodiments will become readily apparent to those skilled in the art from the following detailed description having reference to the attached figures, the disclosure not being limited to any particular disclosed embodiment(s).

BRIEF DESCRIPTION OF THE DRAWINGS

These and other features, aspects, and advantages of the present disclosure are described with reference to the drawings of certain embodiments, which are intended to schematically illustrate certain embodiments and not to limit the disclosure.

DETAILED DESCRIPTION

Although certain embodiments and examples are described below, those of skill in the art will appreciate that the disclosure extends beyond the specifically disclosed embodiments and/or uses and obvious modifications and equivalents thereof. Thus, it is intended that the scope of the disclosure herein disclosed should not be limited by any particular embodiments described below.

Figure 1:
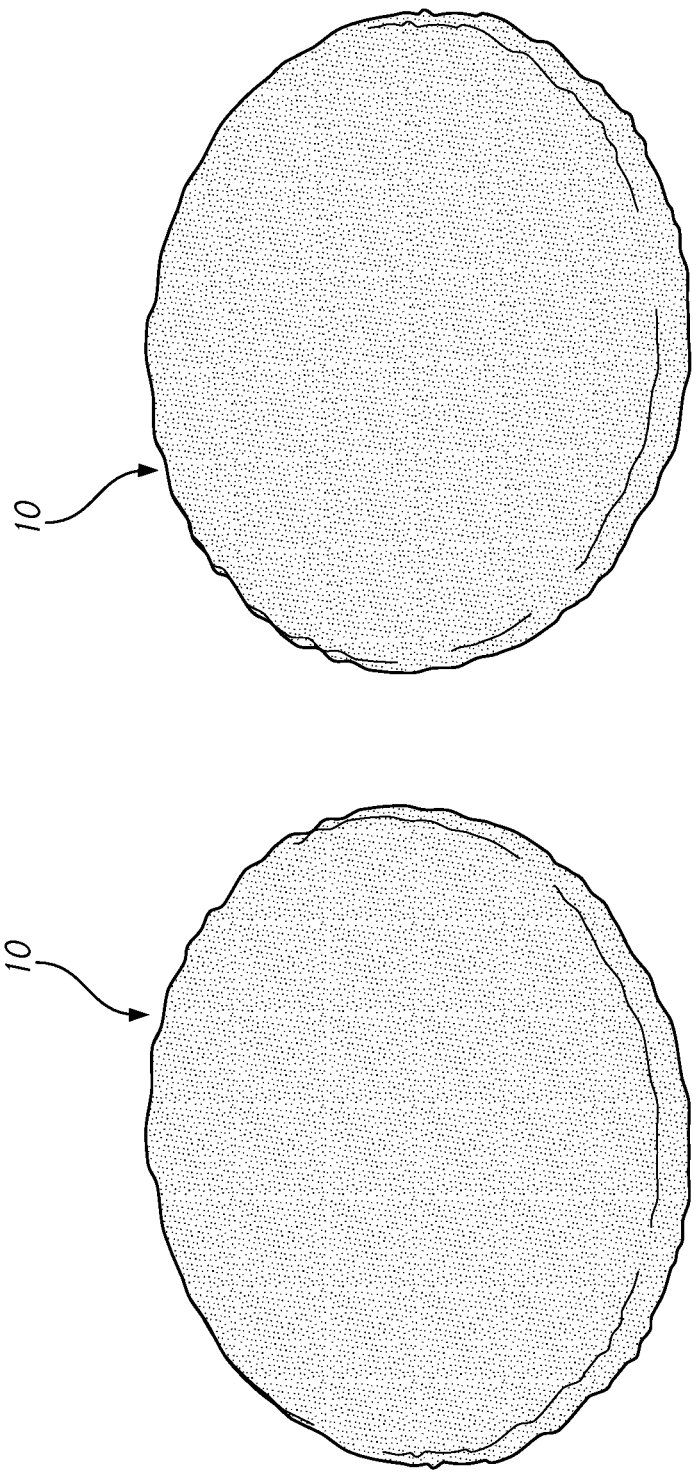
FIG. 1 illustrates two example patties made of potatoes.
Figure 2:
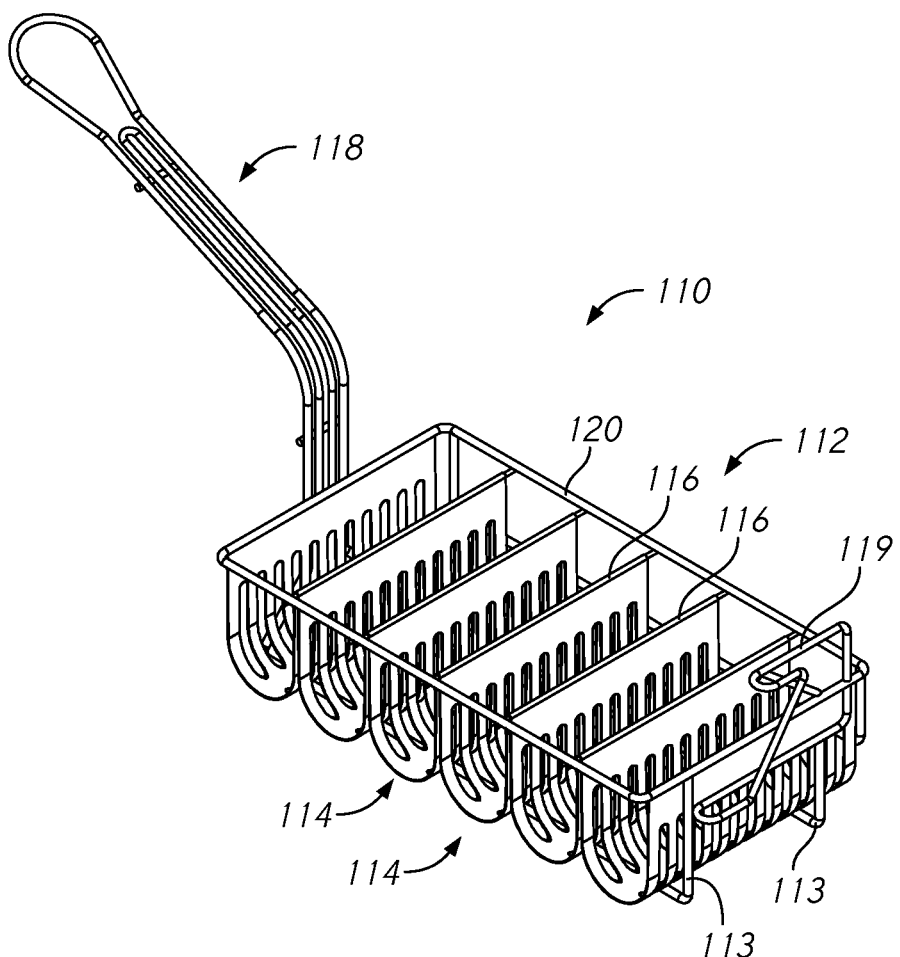
FIG. 2 illustrates a top perspective view of an example embodiment of a basket.
Figure 3:
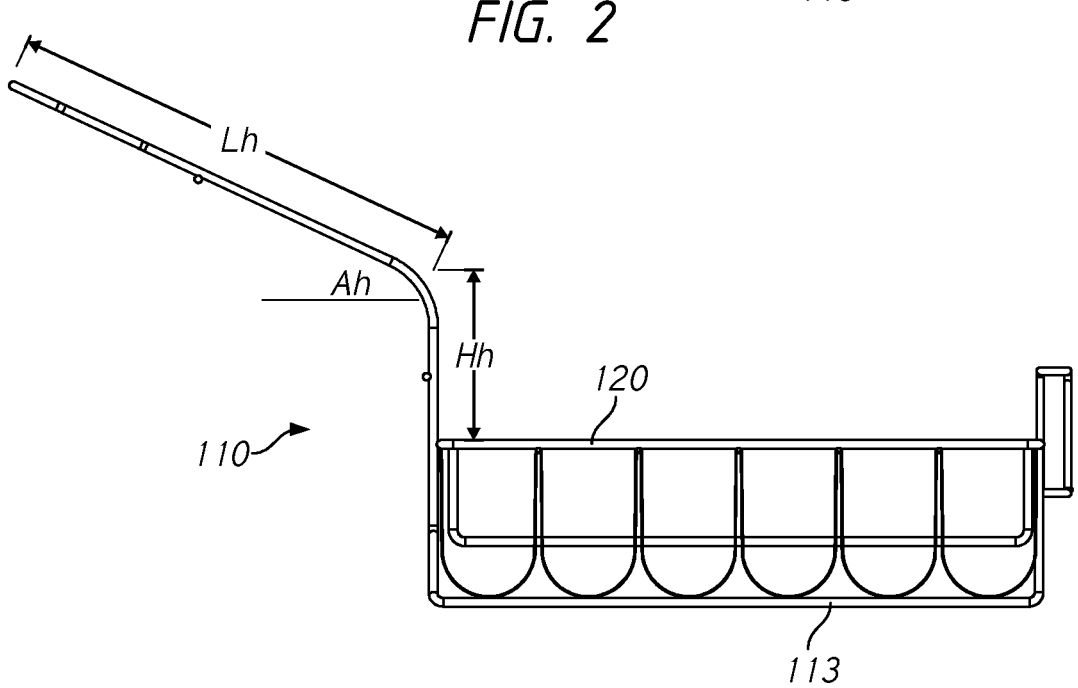
FIG. 3 illustrates a side view of the basket of FIG. 2.
Figure 4:
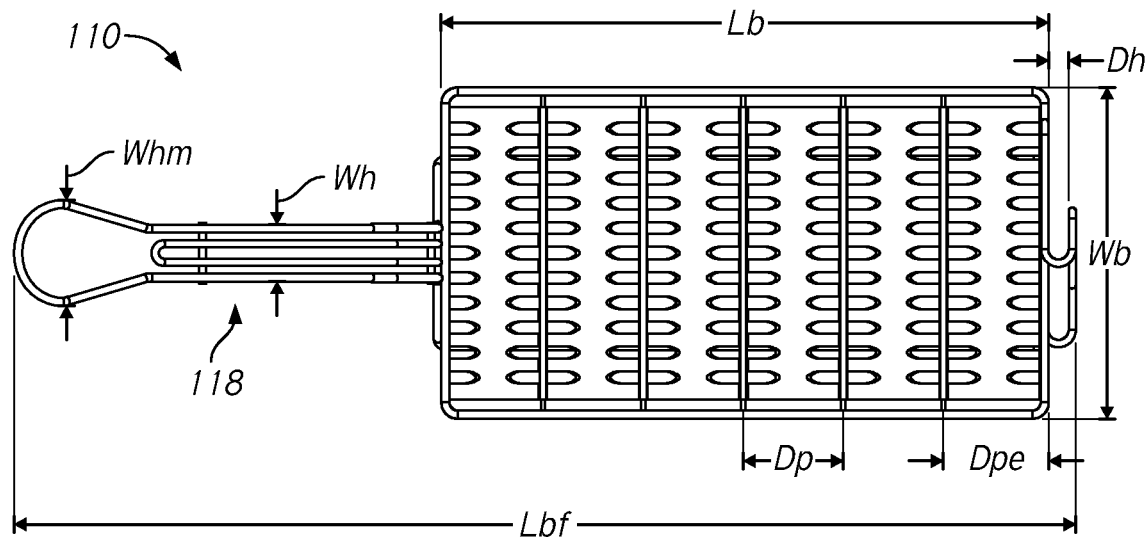
FIG. 4 illustrates a top view of the basket of FIG. 2.
Figure 5:
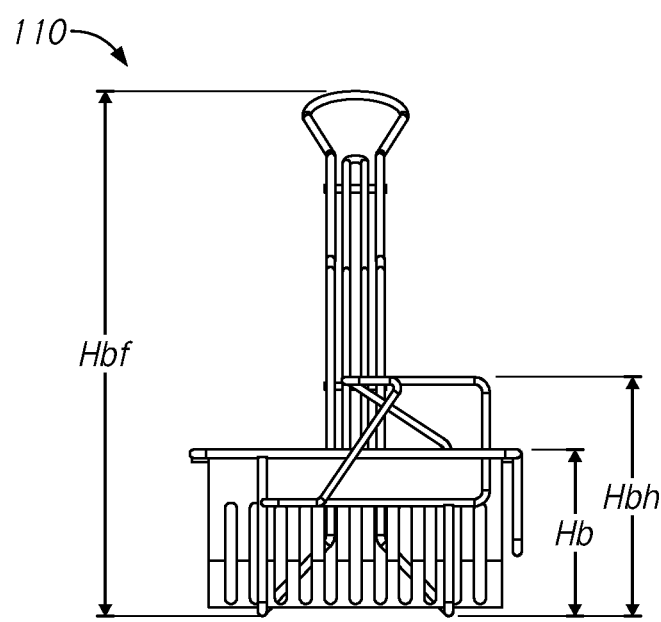
FIG. 5 illustrates a front end view of the basket of FIG. 2.
Figure 6:
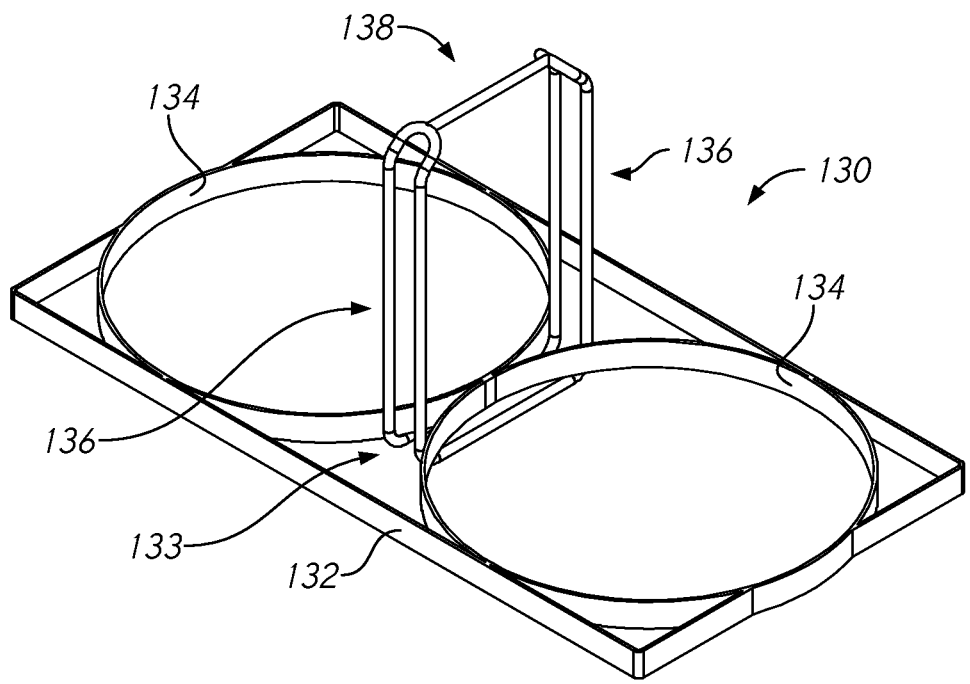
FIG. 6 illustrates a top perspective view of an example embodiment of a tool configured to be used with the basket of FIG. 2.
Figure 7:
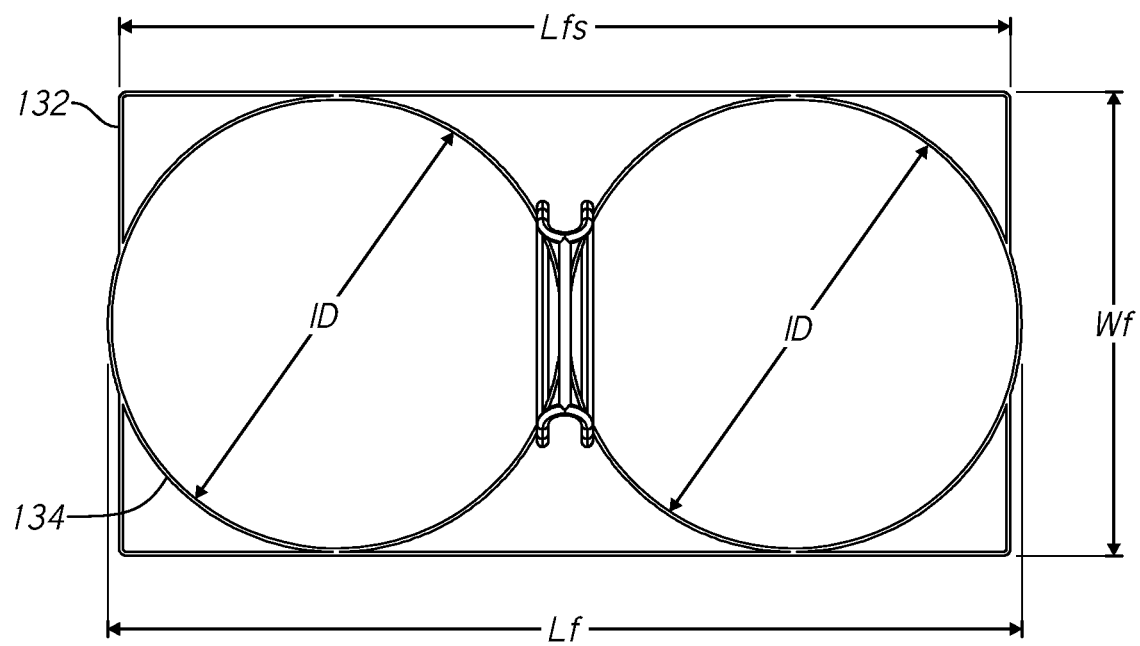
FIG. 7 illustrates a top view of the tool of FIG. 6.
Figure 8:
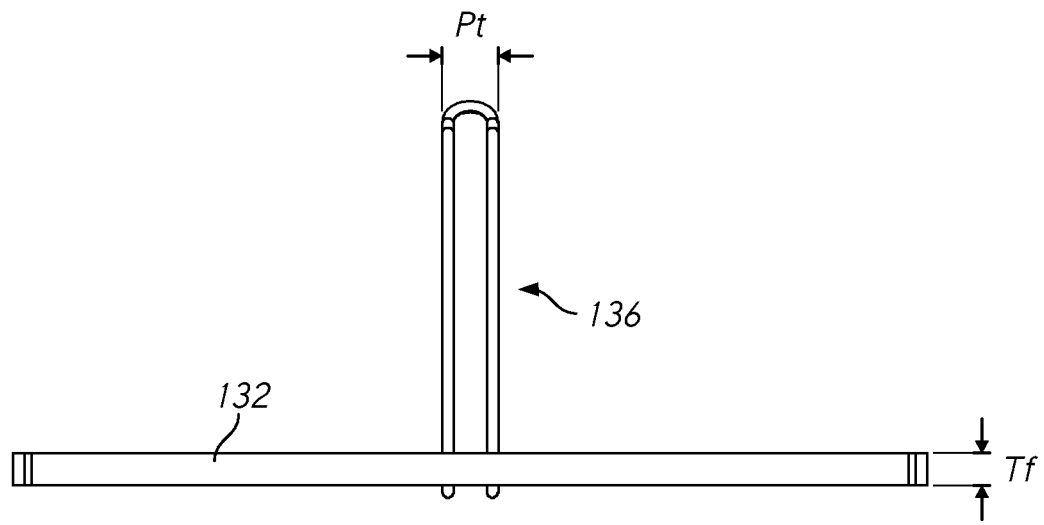
FIG. 8 illustrates a side view of the tool of FIG. 6.

The systems and methods described herein can be used to change the shape of a food item from a first shape to a second shape. For example, the systems and methods described herein can be used to shape a food item into a desired shape, such as a taco shape. The food item can be a patty 10 made of or including, for example, potatoes, various meat, such as chicken or beef, which may be breaded or unbreaded, or another food item. The patty 10 can be round or circular, for example, as shown in FIG. 1. The patty 10 can be another shape, such as square, rectangular, or oval. In some embodiments, the patty 10 is frozen, or otherwise rigid or relatively rigid, before being placed in the systems described herein for cooking and shaping. In some embodiments, the food item is fresh or not frozen before being placed in the systems described herein for cooking and shaping.

Figure 14:
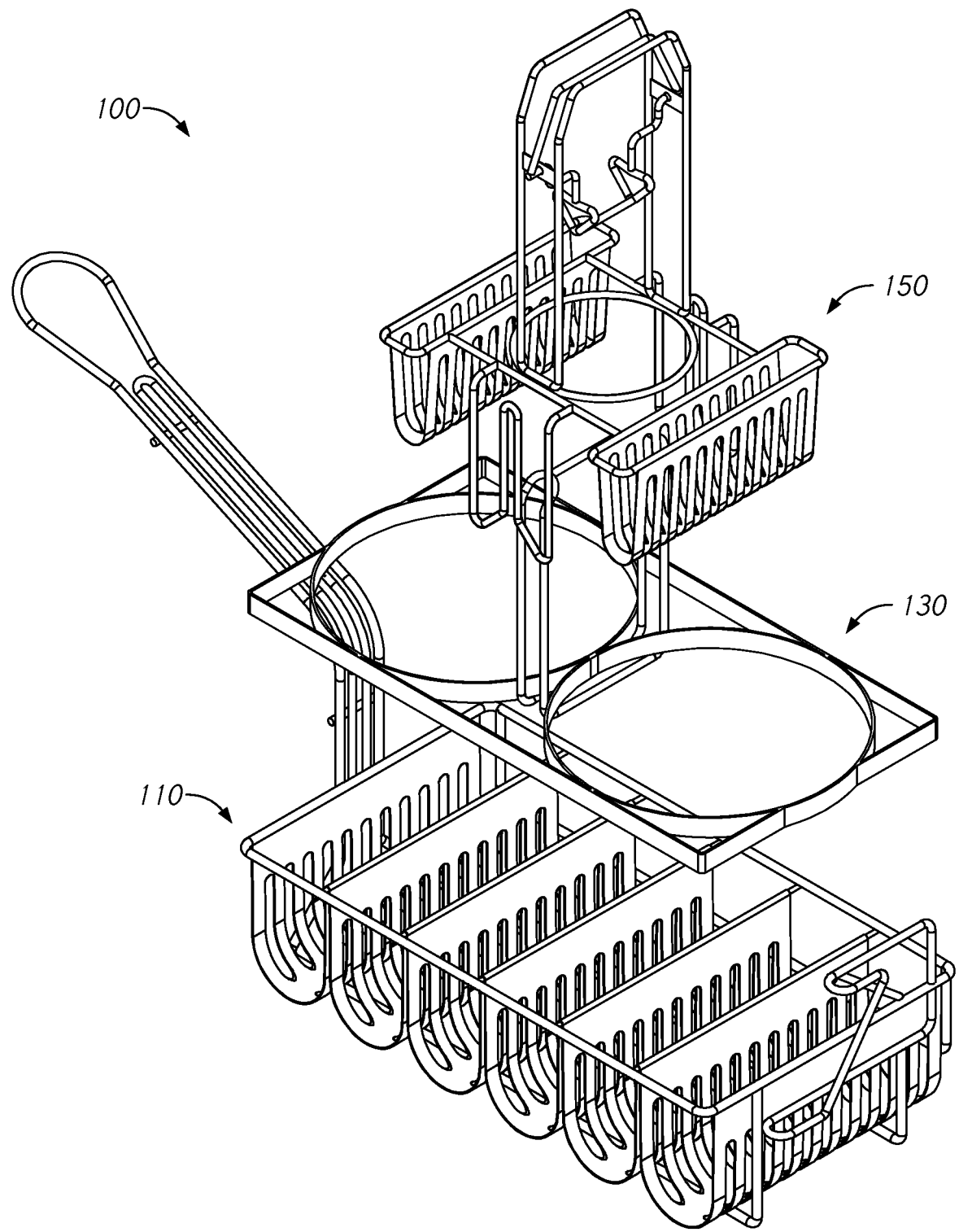
FIG. 14 illustrates an exploded perspective view of the basket of FIG. 2, the tool of FIG. 6, and the insert of FIG. 10 prior to assembly.

In some embodiments, a system 100 for shaping a food item, such as a patty 10, includes a basket 110, a tool 130, and an insert 150. An exploded view of an example embodiment of a system 100 for shaping a food item is shown in FIG. 14. The basket 110, tool 130, and/or insert 150 can be made of metal. In some embodiments, the basket 110, tool 130, and/or insert 150 can be made of plastic. The basket 110, tool 130, and/or insert 150 can be made of a material that is food-safe and suitable for use in high temperatures, such as in a fryer, oven, or microwave.

An example embodiment of a basket 110 is shown in FIGS. 2-5. The basket 110 includes a base 112 having a frame 120 and at least one trough 114. The frame 120, can be rectangular as shown. The illustrated embodiment includes six troughs, but more or fewer troughs 114 are also possible. Each trough 114 is at least partially defined by two peaks 116, one on each side of the trough 114. In embodiments having a plurality of troughs 114, one or more of the peaks 116 may each separate and/or at least partially define two adjacent troughs 114. The peaks 116 can extend between and be connected to the frame 120 of the base 112 as shown. The outermost peaks 116 at the ends of the base 112 extend along or are defined by ends of the frame 120. The basket 110 can include one or more support bars 113 extending lengthwise along a bottom of the basket 110 beneath the troughs 114. In the illustrated embodiment, the basket 110 includes a handle 118 extending from one side or end of the base 112. The basket 110 may include a hook 119 that contacts or engages a fryer during use. In the illustrated embodiment, the basket 110 includes a hook 119 that extends from an opposite end of the base 112 from the handle 118.

In some embodiments, a length Lb (shown in FIG. 4) of the frame 120 of the basket 110 is about 12½ inches and a width Wb of the frame 120 is about 6¾ inches. Adjacent peaks 116 can be separated by a distance Dp of about 2 inches such that the troughs 114 have a width of about 2 inches. The two troughs 114 adjacent the ends of the frame 120 can have a width Dpe of about 2³⁄₁₆ inches. The handle 118 can extend upward from the body 112 by a distance Hh (shown in FIG. 3) of about 3¼ inches, then extend a length Lh of about 8½ inches at an angle Ah of about 25° upward from horizontal. In some embodiments, a body of the handle 118 has a width Wh of about 1¼ inches. An enlarged distal portion of the handle 118 (positioned away from the body 112) may have a width Whm at its widest point of about 1⅞ inches. In embodiments including a hook 119, the hook 119 may extend a distance Dh of about 5/16 inch from an end of the frame 120. A full length Lbf of the basket 110 including the handle 118 and the hook 119 can be about 21 5/16 inches. A height Hb (shown in FIG. 5) of the base 112 including the support bars 113 can be about 3½ inches. A height Hbh of the base 112 including the support bars 113 and hook 119 can be about 5 inches. A full height Hbf of the basket 110 including the handle 118 and the support bars 113 can be about 9½ inches. In some embodiments, the basket 110 can have a weight of about 2-3 pounds. For example, the basket 110 can have a weight of about 2 pounds, 4.7 ounces.

Figure 9:
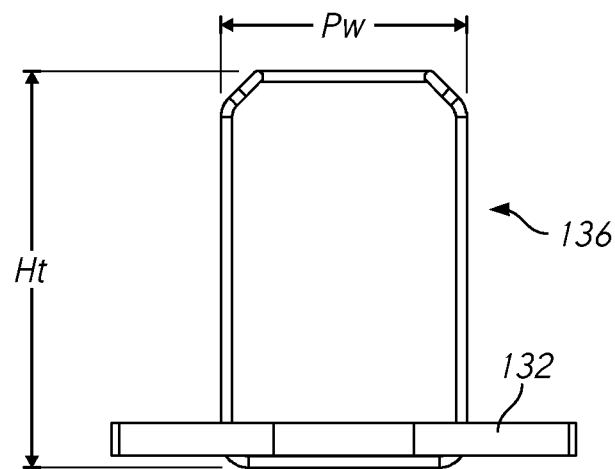
FIG. 9 illustrates an end view of the tool of FIG. 6.
Figure 10:
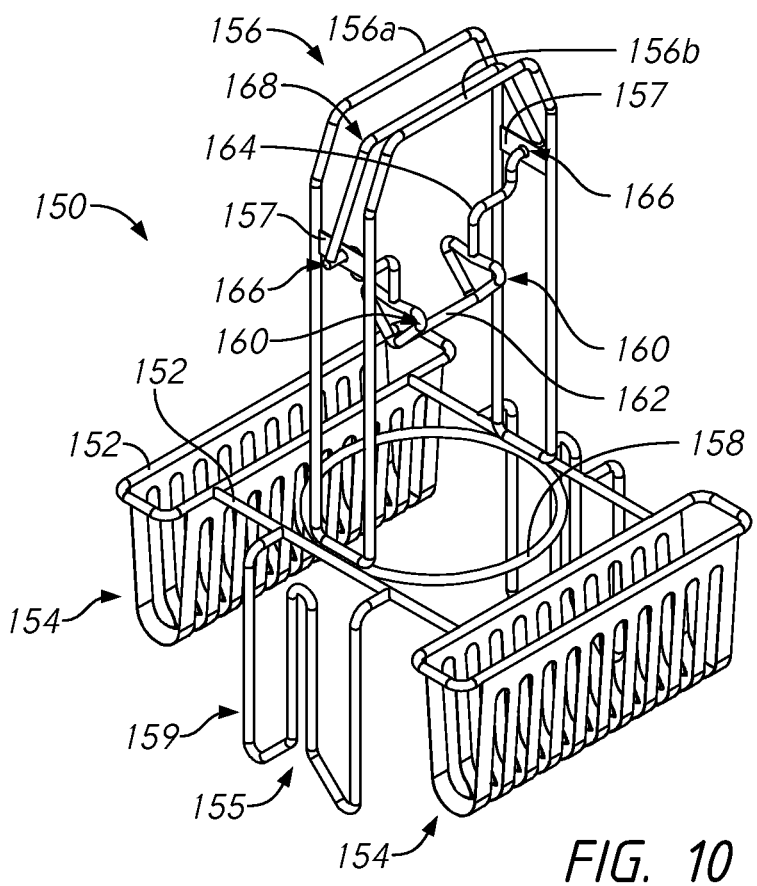
FIG. 10 illustrates a top perspective view of an example embodiment of an insert configured to be used with the basket of FIG. 2 and the tool of FIG. 6.

FIGS. 6-9 illustrate an example embodiment of a tool, which can act as a patty alignment and/or centering tool in certain embodiments, 130. In other embodiments, the tool 130 aligns foods other than a patty. The tool 130 includes two receptacles 134. The receptacles 134 are sized and shaped to receive the food item. For example, the receptacles 134 can be circular as shown to receive circular or generally circular patties 10. Alternatively, the receptacles 134 can be another shape, such as square, rectangular, or oval, to receive other shaped patties 10 or foods. The illustrated circular receptacles 134 meet (e.g., are in contact or near contact with each other) in the center of the tool 130. In the illustrated embodiment, the tool 130 includes a generally rectangular frame 132 surrounding, partially bordering, and/or supporting the two receptacles 134. In the illustrated embodiment, mid portions of the ends of the frame 132 are formed by or curved to accommodate the receptacles 134 such that mid portions of the ends of the frame 132 are curved outwardly. The frame 132 is sized and shaped to at least partially nest or fit with the frame 120 of the base 112 of the basket 110. The tool 130 also includes two upwardly extending posts 136. The posts 136 are positioned centrally along the length of the tool 130 with one disposed on each side of a central longitudinal axis of the tool 130 (e.g., an axis extending parallel to the long sides of the rectangular frame 132 and extending through centers or midpoints of the short sides of the rectangular frame 132). Each post 136 extends upward from and/or through a gap 133 formed between an inner surface of a central portion of a side of the frame 132 and outer surfaces of the two circular receptacles 134. The posts 136 can be coupled or secured to the receptacles 134. A cross-bar 138 extends between and connects upper or top ends of the two posts 136. In some embodiments, the cross-bar 138 can be used as a handle. In the illustrated embodiment, each post 136 includes two parallel wires joined by a U-shaped portion at the top or upper end of the post 136 or a single wire formed in a U-shape such that the curved portion of the U-shape is positioned at the top or upper end of the post 136 and the parallel arms extend downward toward the receptacles 134. The wire(s) forming the posts 136 may also connect to each other at bottom or lower ends of the posts 136 beneath the receptacles 134 as shown in FIG. 9.

The tool 130 is shaped and sized to be placed on and/or nest with the basket 110. The frame 132 can have a width Wf (shown in FIG. 7) of about 6¼ inches. The sides of the frame 132 can have a length Lfs of about 12 inches. The frame 132 can have a total length Lf including curved mid portions of the ends of the frame 132 of about 12¼ inches. The frame can have a height or thickness Tf (shown in FIG. 8) of about 7/16 inch. The receptacles 134 can have inner diameters ID of about 6 inches. A total height Ht (shown in FIG. 9) of the tool 130 can be about 5⅜ inches. The posts 136 can span a distance Pw of about 3 5/16 inches across the width of the frame 132. Each post 136 can have a thickness Pt (measured along the length of the frame 132) of about 13/16 inch. In some embodiments, the tool 130 has a weight of about 0.5-1 pound. For example, the tool 130 can have a weight of about 11 ounces.

An example embodiment of an insert 150 is shown in FIGS. 10-13. The insert 150 includes a frame 152, two wedges 154, and a handle 156. One of the wedges 154 extends downwardly from each end of the frame 152. As shown, the frame 152 can include and/or form an upper perimeter of each wedge 154. The handle 156 extends upwardly from or adjacent to sides of the frame 152. As shown, the handle 156 can include a first bar 156a and a second bar 156b. The second bar 156b is spaced from the first bar 156a along a length of the insert 150. Each bar 156a, 156b extends across a width of the insert 150. The insert 150 includes a guide 158 positioned between the sides of the frame 152. In the illustrated embodiment, the guide 158 is circular, although other shapes are also possible.

Figure 11:
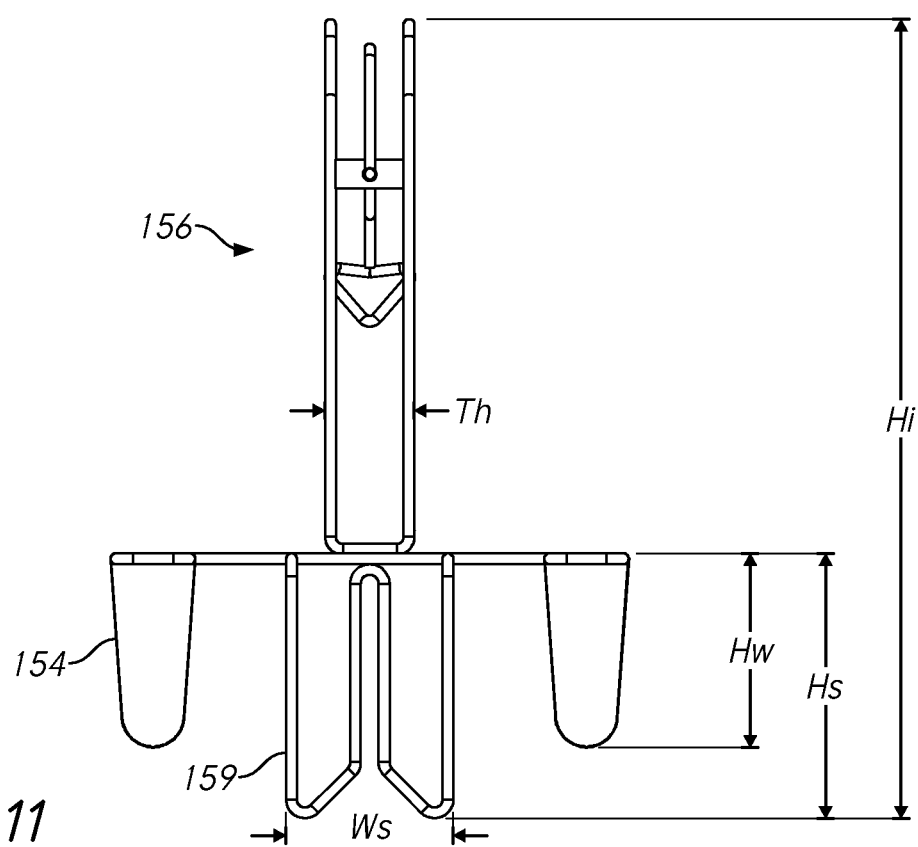
FIG. 11 illustrates a side view of the insert of FIG. 10.
Figure 12:
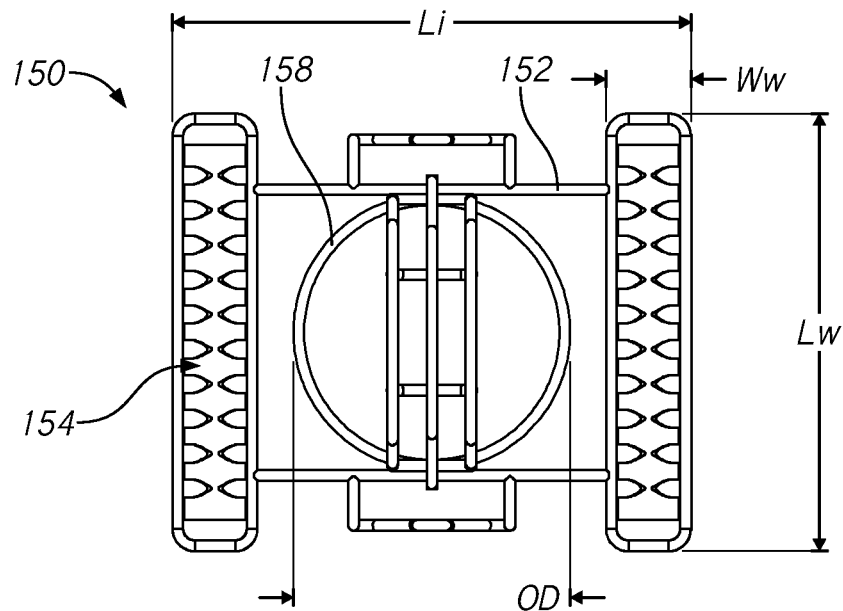
FIG. 12 illustrates a top view of the insert of FIG. 10.
Figure 13:
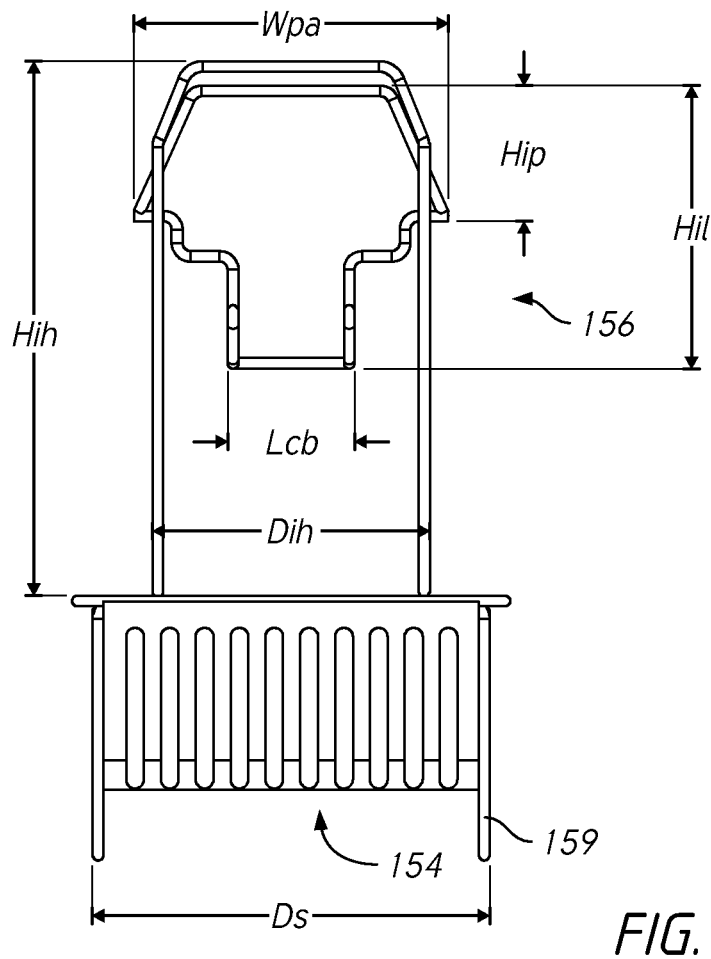
FIG. 13 illustrates an end view of the insert of FIG. 10.

In some embodiments, side guides 159 extend downward from each side of the frame 152. In the illustrated embodiment, the side guides 159 extend outward from the sides of the frame 152 then downward. Each side guide 159 includes a slot or channel 155 extending upwardly from a bottom end of the side guide 159. The cross-section shape of the channel 155 can change along the length of the channel 155. For example, in the illustrated embodiment, an opening or distal end of the channel 155 is wider than a remainder of the channel 155. The channel 155 can taper from the opening to the narrower remainder of the channel 155. As shown in FIG. 11, the side guides 159 can extend further downward or away from the frame 152 than the wedges 154.

The insert 150 is designed to slidingly engage the tool 130 and/or the basket 110 in use. The insert 150 can include one or more features designed to slidingly engage and/or align with one or more corresponding features of the tool 130 and/or the basket 110. For example, the guide 158 can align with and slidingly engage the posts 136 of the tool 130 as described in greater detail herein. Alternatively or in addition, the side guides 159 can align with and slidingly engage a peak 116 of the basket 110 as described in greater detail herein.

The insert 150 can also include a lock mechanism. The lock mechanism includes a cross bar 162 extending along the direction of the width of the insert 150. Each end of the cross bar 162 is coupled to a catch 160. In the illustrated embodiment, the catches 160 are triangular, with one corner pointing downward and coupled to the cross bar 162, and one side forming a top surface of the catch 160. A sidearm 164 extends between the top surface of each catch 160 and the handle 156. In the illustrated embodiment, each side of the handle 156 includes a side bar 157 extending between and coupling the first bar 156a and the second bar 156b of the handle 156. Each sidearm 164 is pivotally coupled to one of the side bars 157 at a pivot point 166. The sidearms 164 extend to inner facing surfaces of the side bars 157. In the illustrated embodiment, a pivot arm 168 extends from an outer facing surface of one side bar 157 across a width of the insert 150 (e.g., along a direction parallel to the handle 156) to an outer facing surface of the other side bar 157. In some embodiments, the pivot arm 168 is coupled to or integrally formed with the sidearms 164 such that the pivot arm 168 and sidearm 164 combination extends through the side bars 157 and is pivotal relative to the side bars 157. Movement of the pivot arm 168 can therefore be coupled to movement of the sidearms 164. Movement, e.g., pivoting, of the pivot arm 168 toward one end of the insert 150 causes the sidearms 164, catches 160, and cross bar 162 to move, e.g., pivot, toward the opposite end of the insert 150. Similarly, movement, e.g., pivoting, of the cross bar 162, catches 160, and sidearms 164 toward one end of the insert 150 causes the pivot arm 168 to move, e.g., pivot, toward the opposite end of the insert 150.

The insert 150 is sized and shaped to be assembled with the tool 130 and basket 110. The frame 152 can have a total length Li (shown in FIG. 12) of about 7 5/16 inches. The portions of the frame 152 forming the tops of the wedges 154 can have lengths Lw of about 6 3/16 inches and widths Ww of about 1 1/4 inches. The guide 158 can have an outer diameter OD of about 3 3/4 inches. The wedges 154 can extend downward from the frame 152 by a distance Hw (shown in FIG. 11) of about 3 1/8. The side guides 155 can extend downward from the frame 152 by a distance Hs of about 3 3/4 inches. The side guides 159 can have a width Ws of about 2 3/4 inches. The side guides 159 can span a distance Ds (shown in FIG. 13) across the width of the frame 152 of about 5 5/8 inches. The handle 156 can have a thickness (measured along the length of the insert 150) Th of about 1 5/16 inches. The handle 156 can have a height Hih of about 7 1/2 inches. The handle 156 can span a distance Dih across the width of the insert 150 of about 4 inches. The crossbar 162 can have a length Lcb of about 1 7/8 inches. A height Hil measured from the pivot arm 168 to the crossbar 162 can be about 3 7/8 inches. A height Hip measured from the pivot arm 168 to the pivot point 166 can be about 1 3/4 inches. A width Wpa of the pivot arm 168 at its widest point, e.g., measured along a line extending through both pivot points, 166 can be about 4 5/16 inches. The insert 150 can have a total height Hi of about 11 1/4 inches. The wedges 154 and troughs 114 are sized and shaped such that when the insert 150 is fully assembled with the tool 130 and basket 110 as described herein, the wedges 154 are received in the troughs 114, and a gap is formed between each wedge 154 and its respective trough 114. The gap forms the second shape or final desired shape of the food item, e.g., a taco shape in the illustrated embodiment.

Figure 15:
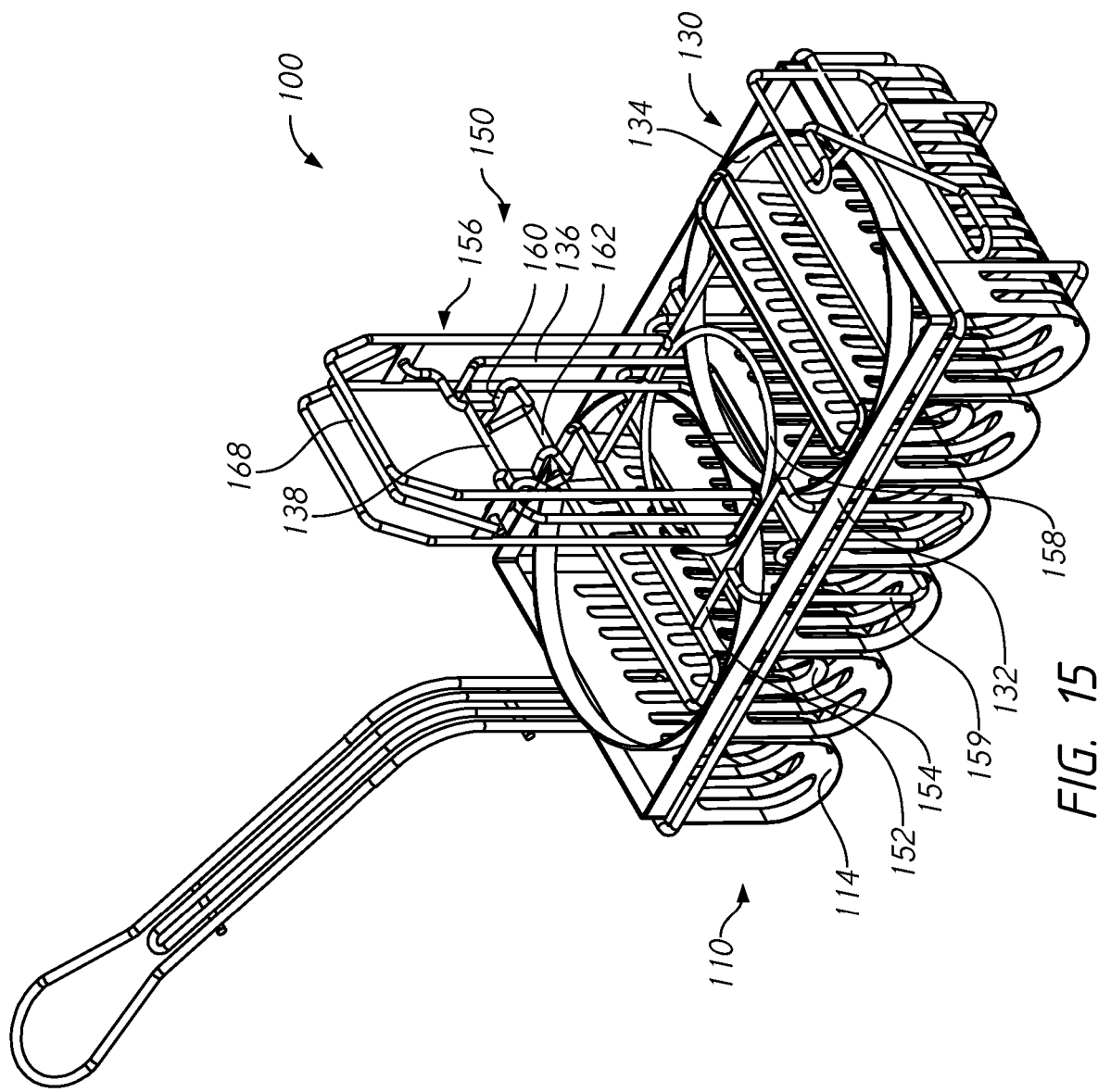
FIG. 15 illustrates a perspective view of the basket, tool, and insert of FIG. 14 assembled together.
Figure 16:
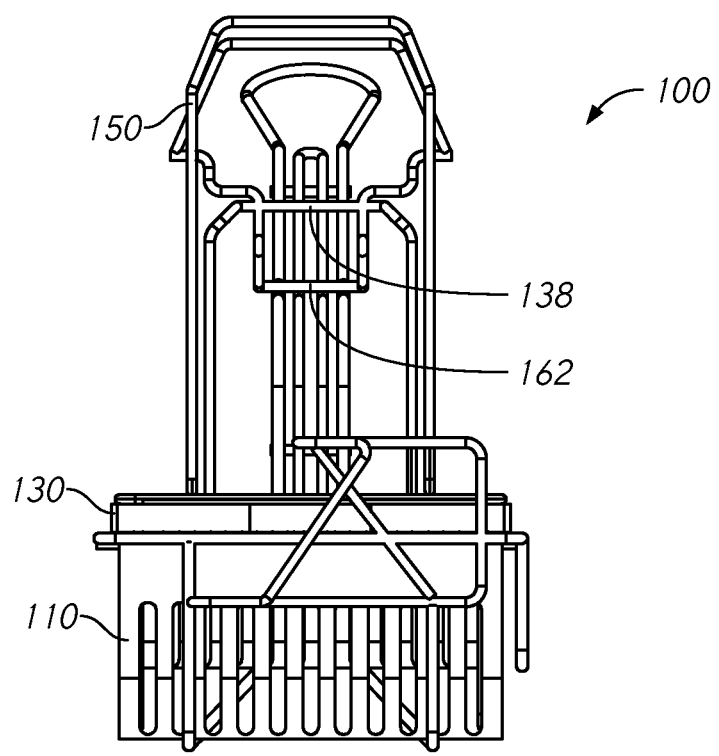
FIG. 16 illustrates an end view of the assembled basket, tool, and insert of FIG. 15.
Figure 17:
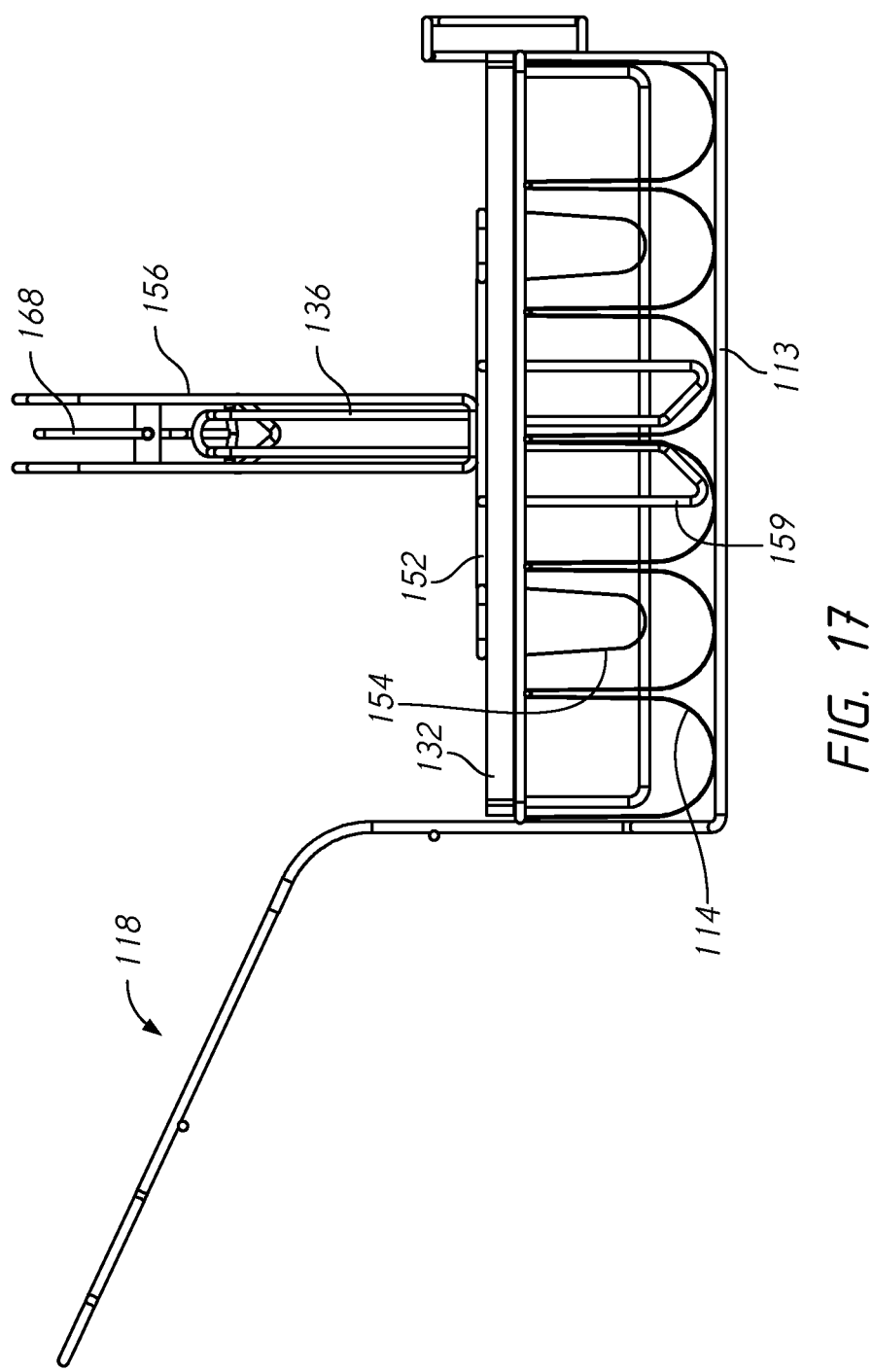
FIG. 17 illustrates a side view of the assembled basket, tool, and insert of FIG. 15.
Figure 18:
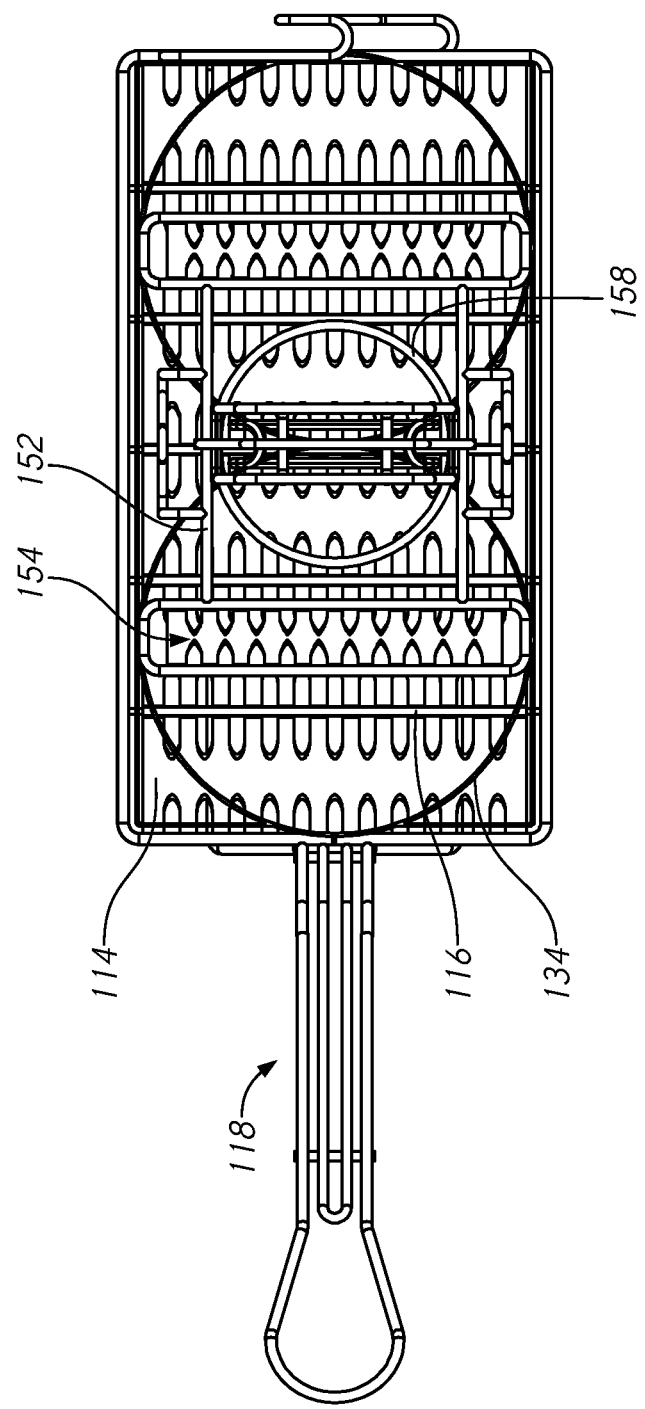
FIG. 18 illustrates a top view of the assembled basket, tool, and insert of FIG. 15.
Figure 19:
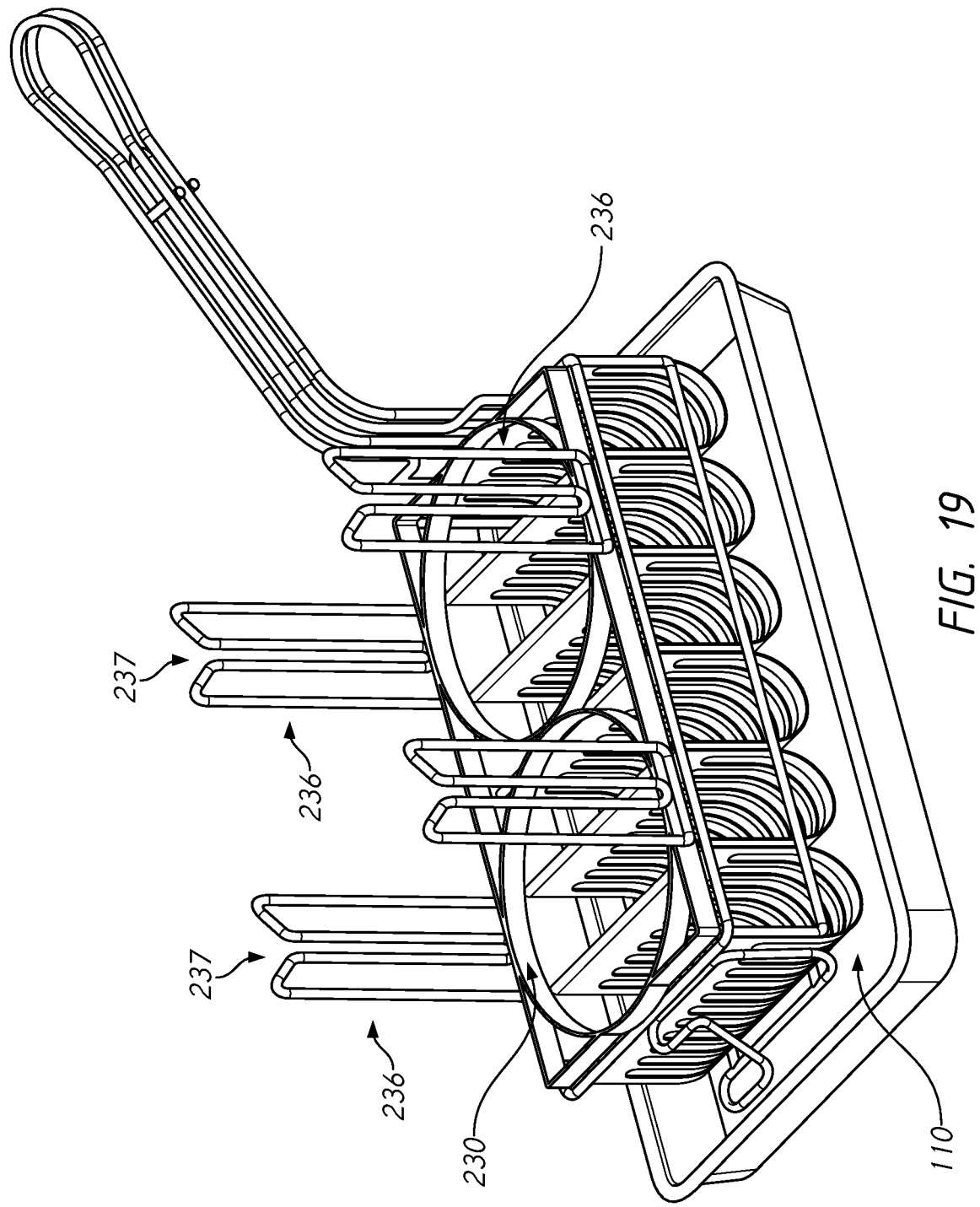
FIG. 19 illustrates another example embodiment of a tool assembled with a basket.
Figure 20:
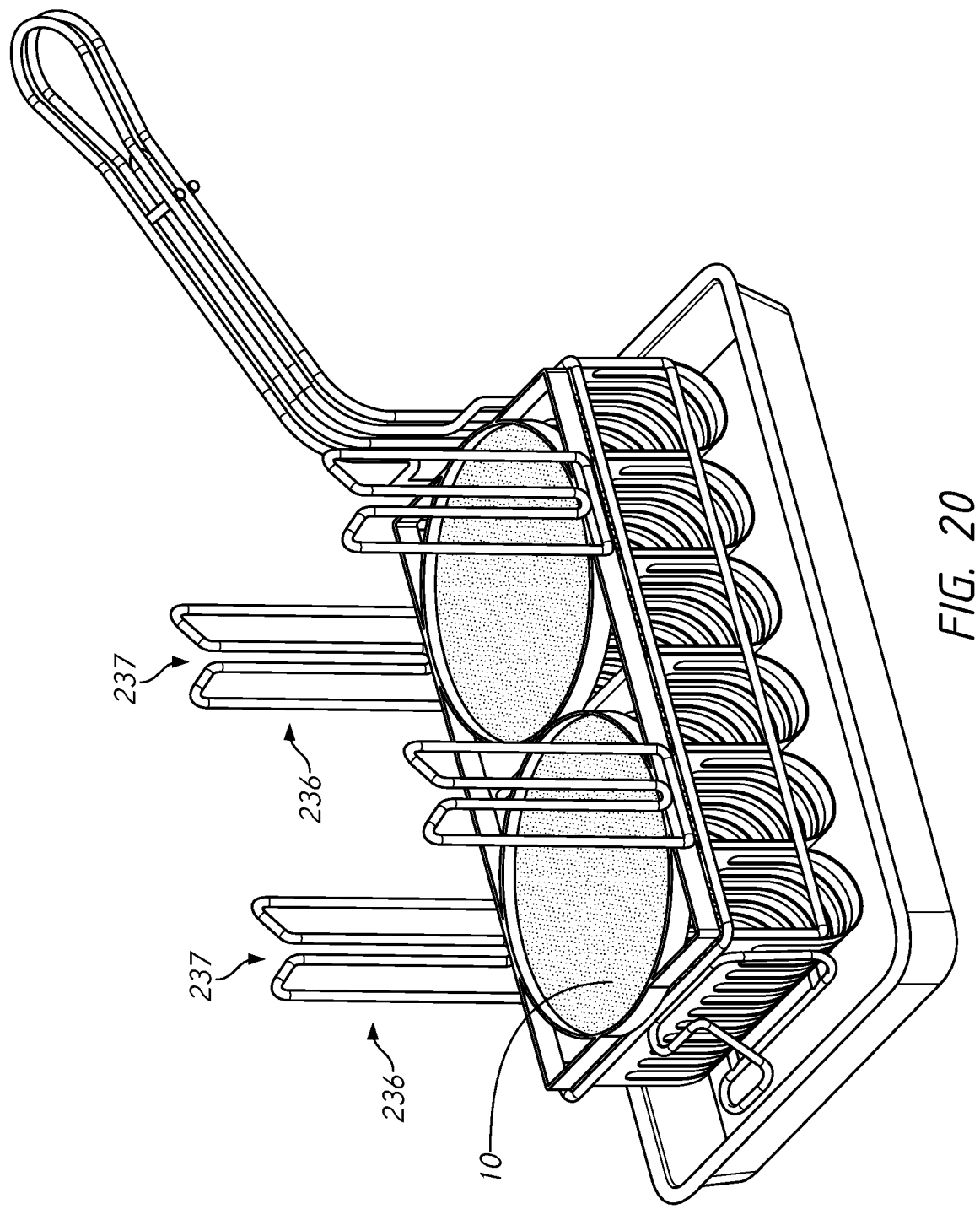
FIG. 20 illustrates the patties of FIG. 1 placed in the assembled tool and basket of FIG. 19.

In use, the tool 130 is placed on or partially nested in the basket 110 such that a central portion of each receptacle 134 is aligned with one of the troughs 114 of the basket 110, for example as shown in FIGS. 15-18 and in FIG. 19, which shows an alternative embodiment of the tool 130. The frame 132 and receptacles 134 rest on and are supported by the peaks 116 of the basket 110. A patty 10 is placed within one or each receptacle 134 (as shown in FIG. 20, which shows the alternative embodiment of the tool 130 of FIG. 19). As discussed above, the patties 10 can be provided frozen such that the patties 10 initially maintain their shape, e.g., round shape. The insert 150 is then guided onto the tool 130. The guide 158 of the insert 150 aligns with and slides along outer surfaces of the posts 136 of the tool 130 to help properly align the insert 150 relative to the tool 130 and/or basket 110 as shown in FIG. 15. As the insert 150 is guided onto the tool 130, the channels 155 align with and at least partially engage one of the peaks 116 (e.g., the central peak 116) to help properly align the insert 150 relative to the basket 110. Because the side guides 159 extend farther downward from the frame 152 than the wedges 154, the channels 155 engage the peak 116 before the wedges 154 contact the patties 10 disposed in the receptacles 134. As the insert 150 is advanced downward relative to the tool 130, one of the wedges 154 contacts each of the patties 10 disposed in the receptacles 134.

The assembled basket 110, tool 130, and insert 150 with patties 10 are placed in a cooking apparatus to cook the patties 10. For example, the assembled basket 110, tool 130, and insert 150 with patties 10 can be placed in a fryer containing hot oil. Alternatively, the basket 110, tool 130, and insert 150 with patties 10 can be placed in an oven or microwave. As the patties 10 cook and soften, the weight of the insert 150 causes the wedges 154 to push the patties 10 into the troughs 114 with which the receptacles 134 are aligned and shape the patties 10 into a taco shape. When the insert 150 is fully seated in or advanced relative to the tool 130 and basket 110 (in other words, when the insert 150 has moved from a first position in which the insert 150 initially engages the tool 130 and a second position in which the insert 150 has been fully advanced downward relative to the tool 130), the wedges 154 are received in the troughs 114 and each patty 10 is formed into the second shape defined by the gap between the wedge 154 and trough 114. The insert 150 can be designed and manufactured to have a weight selected to promote a required or desired rate of the wedges 154 pushing the patties 10 into the troughs 114. The required or desired rate of the wedges 154 pushing the patties 10 into the troughs 114 and weight of the insert 150 can be selected considering the effect of gravity. For example, if the insert 150 is too light and the wedges 154 do not apply enough weight or force to the patties 10, the patties may cook without being forced into the troughs 114 and formed in the desired shape. On the other hand, if the insert 150 is too heavy and the wedges 154 force the patties 10 into the troughs 114 too quickly, the patties 10 may crack as they cook. In some embodiments, the insert 150 is designed and manufactured to have an overall weight of about 1 pound. For example, the insert 150 can have a weight of about 1 pound, 4.2 ounces. A weight of about 1 pound may be appropriate for patties 10 made of, for example, potatoes or chicken. In other embodiments, the insert 150 can have a different weight. The weight of the insert 150 can be selected based on various factors, including, for example, one or more of: the food composition of the patties 10, whether the patties 10 are frozen, the weight of the patties 10, the thickness of the patties 10, and the rigidity of the patties 10. In some embodiments, the weight of the insert 150 is adjustable. In some embodiments, multiple inserts 150 having varying weights can be provided, and a user can select the appropriate insert 150. Such multiple inserts 150 can be identified or distinguished from one another via various markings or indicia, for example, differently colored handles. In some embodiments, the basket 110, the tool 130, and/or the insert 150 can include a mechanism, e.g., a removably attachable mechanism, to alter the rate of movement of the insert 150 relative to the basket 110. For example, if a faster rate of movement was desired, a spring could be attached to the basket 110. The spring could be stretched and attached to the insert 150. As the spring returned to its unstretched state, the spring would pull the insert 150 down more quickly than it might otherwise travel.

During assembly of the system, each side guide 159 slides into one of the gaps 133 as shown in FIGS. 15 and 18. The slots 155 receive one of the peaks 116 (e.g., the central peak 116 in the illustrated embodiment) and allow the side guides 159 to slide along and/or into the two troughs 114 adjacent the peak 116 received in the channel 155. Because the side guides 159 extend further downward or away from the frame 152 than the wedges 154, the side guides 159 can align with and/or engage the basket 110 prior to cooking and shaping of the patties 10. The side guides 159 can advantageously help properly align the insert 150 relative to the tool 130 and/or basket 110 and/or help secure the insert 150 to the tool 130 and/or basket 110 during use. As the patties 10 cook and the insert 150 slides downward relative to the tool 130, the side guides 159 can help maintain balance of the insert 150 and alignment of the insert 150 relative to the tool 130 and/or basket 110. For example, if two patties 10 are being cooked, if one patty 10 is larger and/or heavier than the other, one of the patties 10 may be shaped more quickly and easily than the other, and the wedges 154 may not advance into the troughs 114 evenly or simultaneously if not otherwise constrained. The insert 150 could therefore become askew and misaligned relative to the tool 130 and/or basket 110. The side guides 159 help inhibit such imbalance or misalignment of the insert 150 as movement of the insert 150 relative to the tool 130 and/or basket 110 is constrained by mating of the peak 116 with the channel 155.

As the insert 150 is advanced onto the tool 130 and basket 110 during cooking, the crossbar 162 of the locking mechanism of the insert 150 contacts the cross bar 138 of the tool 130. The crossbar 162, catches 160, and sidearms 164 can then pivot (in either direction) about pivot points 166 so that the crossbar 162, catches 160, and/or sidearms 164 can slide past the crossbar 138. The crossbar 162, catches 160, and sidearms 164 can also or alternatively be manually pivoted by the user via the pivot arm 168. The crossbar 162 of the insert 150 is shorter than the crossbar 138 of the tool 130 such that the catches 160 also contact and slide past the crossbar 138. The sloped sides of the triangular catches 160 can help the catches 160 slide past the crossbar 138. Once the crossbar 162 and catches 160 have cleared the crossbar 138, the crossbar 162, catches 160, and sidearms 164 pivot about the pivot points 166 back toward a central vertical position. Portions of the upper surfaces of the catches 160 are then disposed below the crossbar 138 of the tool 130 as shown in FIGS. 15-18. If a user pulls the insert 150 upward relative to and away from the tool 130 and basket 110, the upper surfaces of the catches 160 contact the crossbar 138 of the tool 130 so that the tool 130 is also pulled upward and away from the basket 110 with the insert 150. The locking mechanism therefore helps inhibit the insert 150 from being separated from or removed from the basket 110 separately from the tool 130. The locking mechanism can serve as a safety mechanism and/or can help promote ease of use such that the insert 150 and tool 130 can be more easily removed together from the basket 110 when desired or required.

Figure 23:
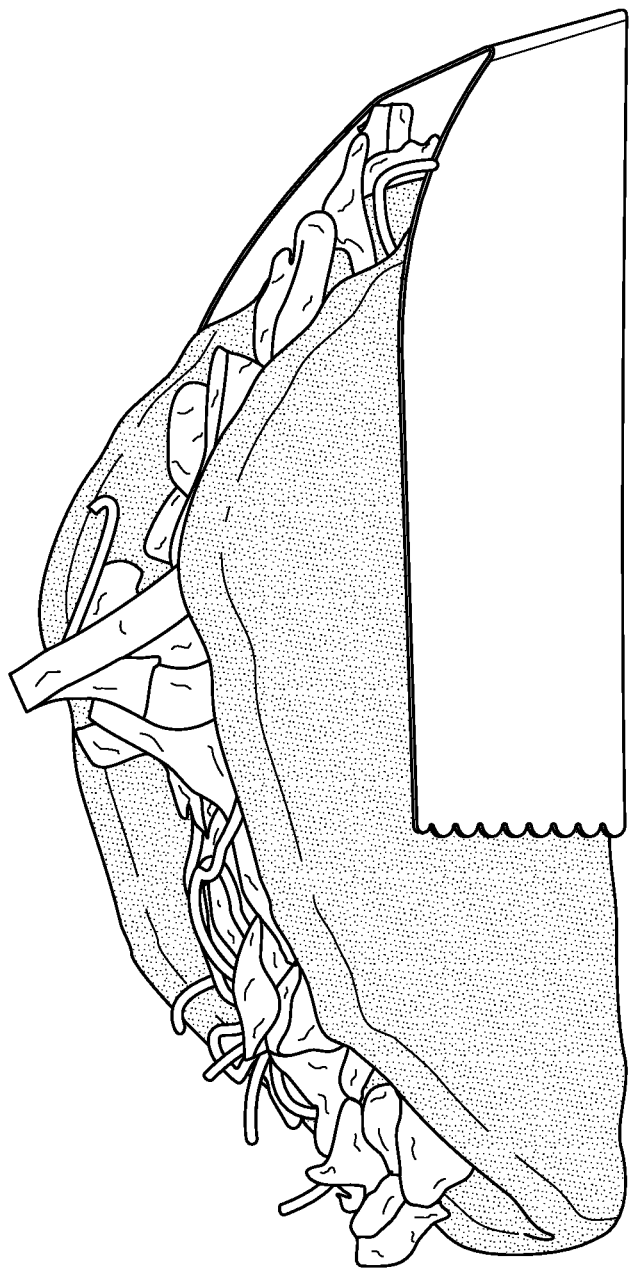
FIG. 23 illustrates a side view of one of the patties of FIG. 1 shaped into a taco shape and filled with fillings.
Figure 24:
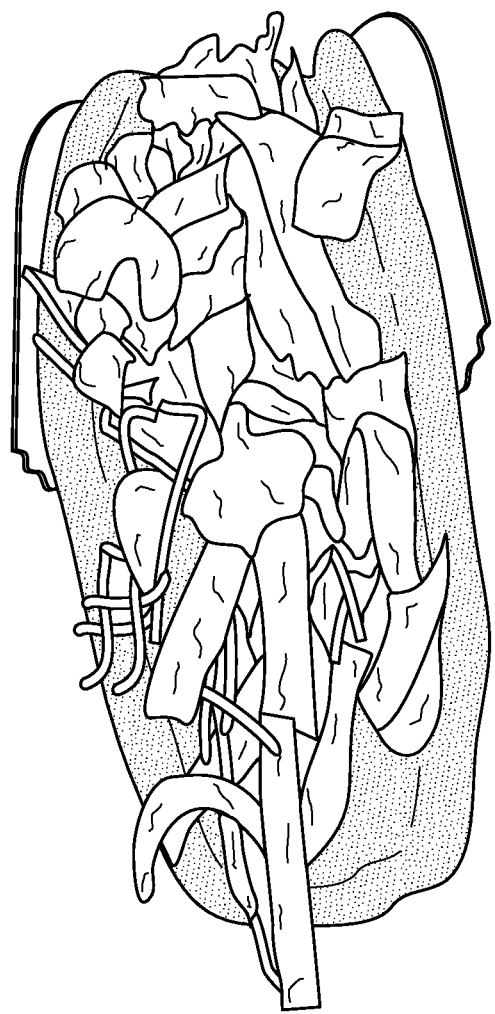
FIG. 24 illustrates a top view of the taco of FIG. 23.

Once an appropriate cooking time has elapsed, the assembly is removed from the oil, the insert 150 and tool 130 are removed from the basket 110 (before or after removing the assembly from the oil), and the now cooked and shaped patties 10 are removed from the basket 110. The cooked and taco shaped patties 10 can be filled with various fillings, as shown in FIGS. 23 and 24.

Figure 21:
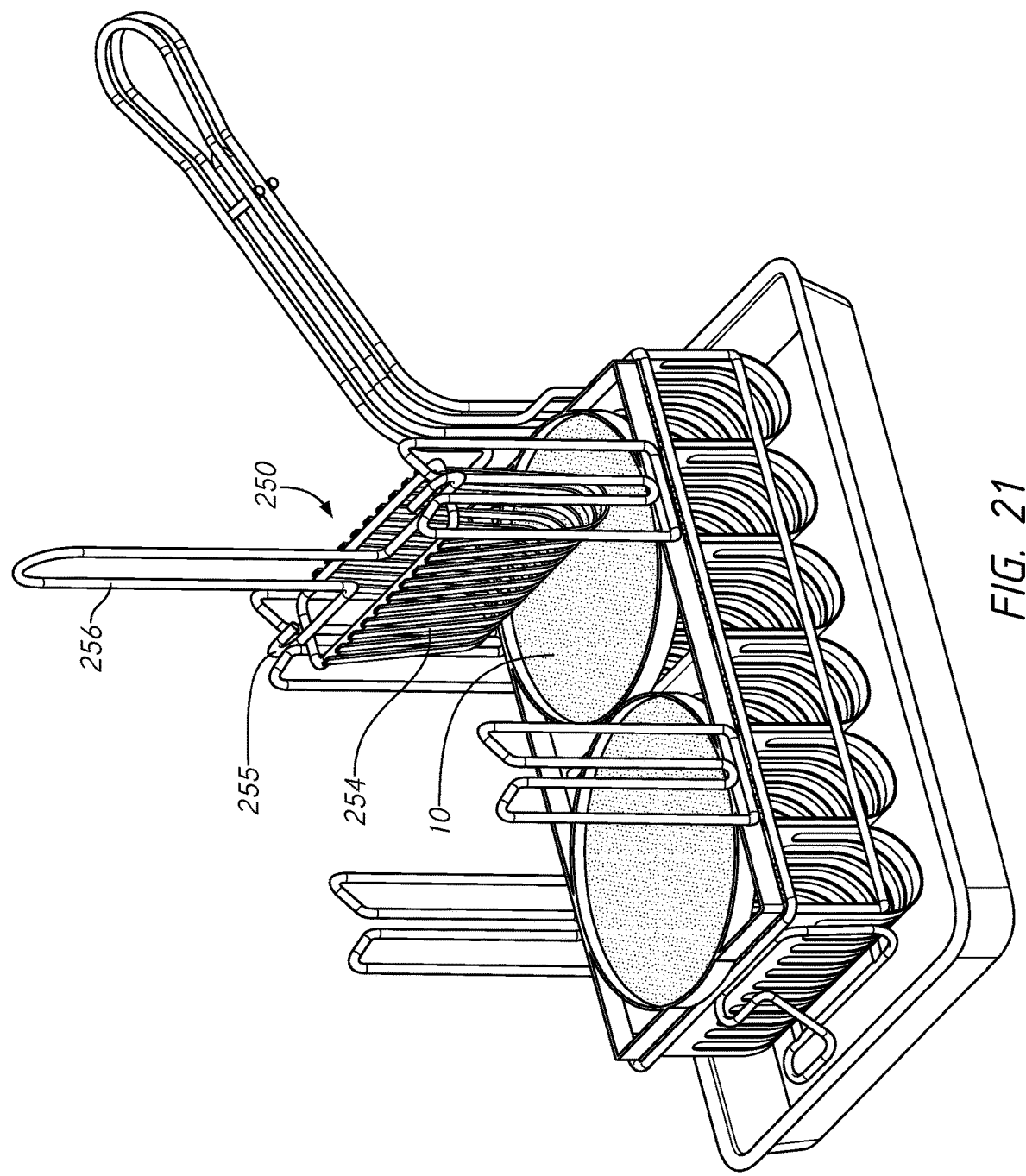
FIG. 21 illustrates the patties, tool, and basket of FIG. 20 and another example embodiment of an insert assembled with the tool.
Figure 22:
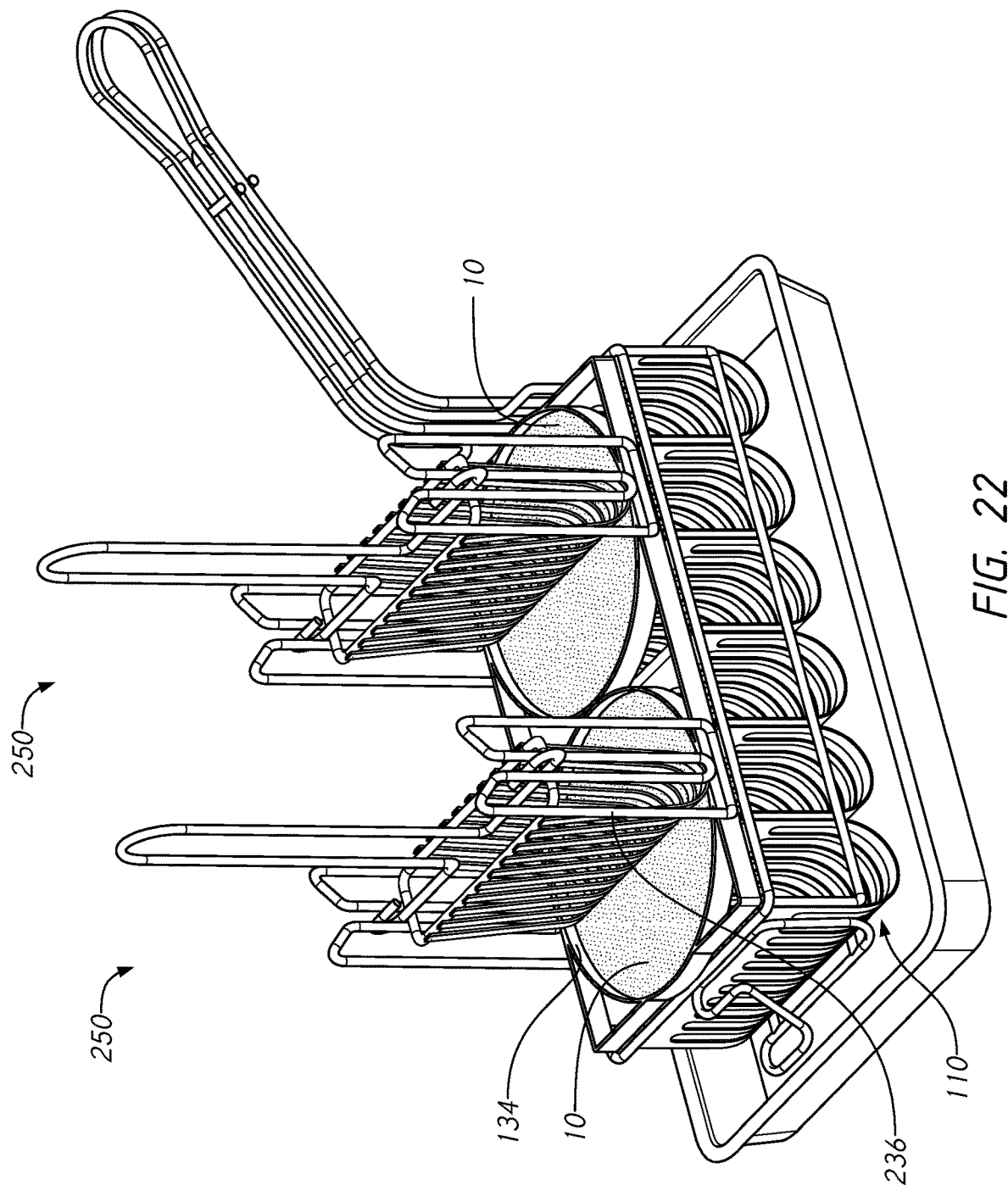
FIG. 22 is similar to FIG. 21, showing a second insert assembled with the tool.

FIGS. 19-22 illustrate alternative embodiments of the tool 230 and insert 250. In this embodiment, rather than the centrally located posts 136 of tool 130, tool 230 includes four posts 236. Two posts 236 are located along each side of the tool 230, with one positioned adjacent each receptacle 134. Therefore, each receptacle 134 is positioned between two opposing posts 236. Each post 236 includes a slot 237 extending downwardly from a top of the post 236. As shown in FIGS. 21-22, the insert 250 of this embodiment includes a wedge 254 and a handle 256 extending upwardly from the wedge 254. The insert 250 can also include an alignment projection 255 extending outwardly from each end of the wedge 254. The wedge 254 is sized to slide between two opposing posts 236 to contact the patty 10 disposed in the receptacle 134 as shown in FIG. 21. The alignment projections 255 slide within the slots 237 of the opposing posts 236 to help properly align the wedge 254 with the patty 10 and basket 110. As shown in FIG. 22, two inserts 250 can be assembled with the tool 230, one aligned with each pair of opposing posts 236. The inserts 250 can be separate from each other or may be temporarily or permanently coupled (e.g., via the handles 256). Separate inserts 250 can advantageously allow two patties 10 to be cooked and shaped in the system at different times. In other words, one patty 10 and insert 250 could be assembled with the tool 230 and basket 110 to begin cooking and shaping, and then a second patty 10 and insert 250 could be assembled with the tool 230 and basket 110 to begin cooking and shaping at a later time, e.g., while the first patty 10 is still cooking.

Although the example embodiments shown and described herein includes a basket 110 having six troughs 114, the basket 110 could include only two troughs 114—one to align with each of two receptacles 134. Although the example embodiments shown and described herein includes two receptacles 134 and two corresponding wedges 154, the basket 110, tool 130, and insert 150 can be scaled to include more receptacles 134 and corresponding wedges 154 to allow for more patties 10 to be cooked and shaped at once if desired. Although in the example embodiments shown and described herein the basket 110 includes troughs 114 and the insert 150, 250 includes wedges 154, 254, in some embodiments, those features could be reversed such that the basket 110 includes wedges 154 and the insert 150, 250 includes troughs 114. In other words, more generally, while in the illustrated embodiments the basket 110 acts as a female die and the insert 150, 250 acts as a male die, in other embodiments, the basket 110 can include features such that the basket 110 acts as a male die and the insert 150, 250 can include features such that the insert 150 acts as a female die. Furthermore, while the mating or engaging features of the male and female die are described as wedges and troughs in the example embodiments shown and described herein, other mating or engaging features that allow the insert 150, 250 to act as one of the male and female die and the basket 110 to act as the other of the male and female die are also possible. Although the mating features shown and described herein (the wedges 154 and troughs 114) are designed to form a patty 10 into a taco shape, the mating features can have other sizes, shapes, and/or configurations to form a patty 10 or other food item into another desired shape (e.g., a bowl shape).

Although this disclosure has been described in the context of certain embodiments and examples, it will be understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may comprise, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise. Additionally, as used herein, "gradually" has its ordinary meaning (e.g., differs from a non-continuous, such as a step-like, change).

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A system for changing a shape of a food item from a first shape to a second shape, the system comprising:
    a tool comprising a frame, two receptacles, each receptacle configured to receive a food item when the food item is in the first shape, and at least one post extending upwardly from the tool; and
    an insert configured to slidingly engage with the tool, the insert comprising a frame, a guide, two wedges extending downward from the frame, and a handle,
    wherein the guide of the insert is configured to receive and slide along an outer surface of the at least one post of the tool in use, and each wedge is configured to contact the food item received in one of the receptacles and urge the food item into the second shape,
    wherein the at least one post comprises two posts and the tool comprises a crossbar extending between and connecting upper ends of the posts, wherein the insert comprises a locking mechanism comprising a crossbar and a catch at each end of the crossbar, the crossbar and catches being pivotally coupled to the handle, and wherein as the insert is assembled with the tool in use, the crossbar and catches of the insert pivot relative to the handle to allow the crossbar and catches to slide past the crossbar of the tool, once the crossbar and catches of the insert have cleared the crossbar of the tool, the crossbar and catches pivot back toward their original orientation and portions of the catches are disposed below the crossbar of the tool, and if a user attempts to lift the insert away from the tool, the catches contact the crossbar of the tool and cause the tool to be lifted along with the insert.

2. The system of claim 1, wherein the insert comprises two side guides, each extending outward and then downward from the frame of the insert, the side guides configured to be received in gaps formed between the frame of the tool and the receptacles of the tool.

3. The system of claim 1, further comprising a basket comprising at least two troughs, the tool configured to be placed on the basket such that the receptacles align with the troughs, and the wedges are configured to urge each food item received in the two receptacles into the at least two troughs during cooking to shape each food item into the second shape.

4. The system of claim 3, wherein the two wedges are shaped to fit within the at least two troughs and provide a gap between the two wedges and the at least two troughs.

5. The system of claim 1, wherein the insert further comprises a channel sized and shaped to engage a peak of the basket.

\* \* \* \* \*